(No Model.)
H. R. HARPER.
BOTTLE, &c.
No. 512,374. Patented Jan. 9, 1894.
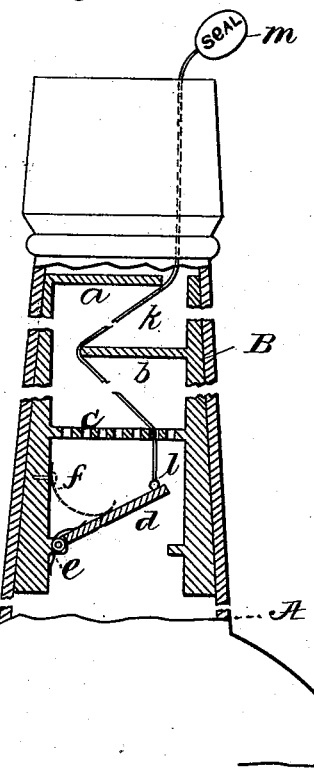
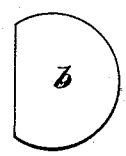
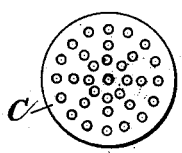
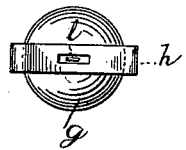
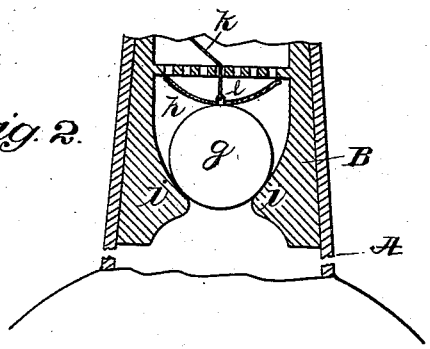
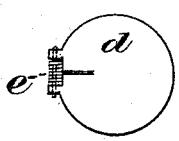
WITNESSES:
Edward C. Rowland
Francis A. Winslow
Anderson Price
INVENTOR
Horatio R. Harper
BY Augustus T. Gurlitz
ATTORNEY

UNITED STATES PATENT OFFICE.

HORATIO R. HARPER, OF SANDS POINT, NEW YORK.

BOTTLE, &c.

SPECIFICATION forming part of Letters Patent No. 512,374, dated January 9, 1894.

Application filed June 8, 1893. Serial No. 476,982. (No model.)

*To all whom it may concern:*

Be it known that I, HORATIO R. HARPER, a citizen of the United States, residing at Sands Point, Queens county, and State of New York, have invented certain new and useful Improvements in Bottles and Similar Vessels, of which the following is a full, clear, and exact description, such as will enable others skilled in the art to which it appertains to make and use the same, reference being had to the accompanying drawings and the letters of reference marked thereon, which form part of this specification.

The object of this invention is to provide a bottle or a similar vessel with an automatic closing device such as will permit the liquid contents of the vessel to be readily discharged, but will prevent the re-filling of the vessel in whatever position it may be placed, so that a bottle provided with this invention cannot be re-filled with spurious or other preparations after it has once been emptied.

In the drawings, Figure 1 represents the neck of a bottle, partly in vertical central section, containing my invention. Fig. 2 is a portion of the neck of a bottle showing another form of my invention. Fig. 3 is a top view of the self-closing valve, d. Fig. 4 is a top view of the strainer obstruction, c. Fig. 5 is a top view of another obstruction, b. Fig. 6 is a top view of another obstruction, a. Fig. 7 is a top view of the ball valve and spring.

Similar letters of reference indicate like parts in all the drawings.

My invention consists essentially of a closing device for the outlets of bottles, demijohns, jugs and kindred vessels, which device is provided with suitable means to keep it normally closed against the ingress of liquids from without the bottle, &c., in whatever position the same may be placed, but to permit the discharge of the liquid contents from within the bottle; suitable means by which such closing device can be held open to permit the first filling of the bottle, and can then be readily removed; and suitable guards or obstructions which will prevent access to or improper tampering with such closing device after the bottle, &c., has been once filled.

I describe and illustrate two examples of my invention.

A represents the neck of a bottle, and B is the closing device which may be made as an entire structure, or in sections, and separately from the bottle neck and then inserted into and suitably cemented thereto; or in parts, or sections; or the whole may be made as an integral part of the neck, or made in part separate and inserted into and secured within the neck, and in part integral with the neck itself, as the exigencies of manufacturing the bottles, &c., may render expedient and desirable.

In the example of my invention shown in Fig. 1, $d$ is a valve, adapted to close down upon a suitable valve seat to close the bottle, and held normally to its seat closed, by the action of a closing spring $e$, which may be wound around its pintle as clearly shown in Figs. 1 and 3. Or, if desired a spring, $f$, shown by dotted lines in Fig. 1, may be substituted for such spring $e$, to accomplish the same purpose. At a suitable point in this valve an eye $l$, is formed and through this a suitable lifting device, as a cord or thin wire, $k$, is drawn, both ends of which are then carried through the strainer guard $c$, and beyond the other obstructions $b$, $a$, to without the bottle, where they are suitably secured as by the seal $m$. At a suitable position above the valve $d$, a perforated disk or strainer guard $c$, is secured in any suitable manner, which is to be placed far enough above such valve to permit the same to be sufficiently opened to allow the egress of the fluid contents of the bottle, and also to be drawn up by the temporary opening device, the wire $k$, to permit the first filling of the bottle, &c. Other obstructions or guards $b$, $a$, are arranged above the valve $d$, to further guard against tampering with the closing device. The guards here shown, consist of disk shaped obstructions, portions of which have been cut away on opposite sides of the neck, so as to render it impracticable to reach the closing device from without the bottle to open it for re-filling.

Fig. 2 is an illustration of another example of my invention. In this the valve seat is formed by the annular contraction $i, i$, of the neck of the bottle or of the closing portion, and the employment of a ball valve, $g$, with a suitable spring $h$, to hold it in place, normally, in its seat. The spring $h$, may be curved to have its extremities bear against the under side of the strainer guard c, and its middle portion press upon the valve g. An eye, l, as in the other example of my invention is arranged to receive the lifting device or wire, k, and suitable obstructions as the strainer guard c, or other guards are to be disposed above it to prevent access thereto, as already described in relation to the example of my invention shown in Fig. 1. The springs shown, as e, f, h, are to be of such power as to keep the respective valve or closing device in place to close the orifice of the bottle, &c., in whatever position the same may be placed, but not to be of sufficient power to prevent the opening of such valve or closing device by the pressure of the contents of the bottle when the same is suitably placed or turned to discharge its contents; these springs, therefore, are to be adjusted to the weight or resistance of the respective valves or closing devices on which they are to be employed.

The bottle, &c., is to be filled by holding the closing device open by means of the lifting device, as the wire, k, and after the bottle is filled this is to be withdrawn, whereupon the contents of the bottle may be discharged at pleasure, but it will not be practicable to fill the bottle again.

The closing device, valve, and obstructions, may be made of hard rubber, glass, stone, pottery, porcelain, or other suitable material, and non-corrosive metals may also be employed; and the springs e, f, h, may also be made of non-corrosive metal or other suitable material, according to the purposes for which the bottle, &c., is to be used.

I do not claim broadly the disposing of a valve in the neck of a bottle, nor the arrangement of a guard or guards above a valve in the neck of a bottle; neither do I limit myself to the valve shown, nor to the guards shown, nor to the arrangement of the guards as shown, either in relation to each other or to the valve, as these may all be varied without departing from my invention, but

Having thus described my invention, what I claim as new, and desire to secure by Letters Patent, is—

1. A device adapted to be disposed in the neck of a bottle to prevent refilling the same, provided with a valve, d, having a spring, e, obstructions, c, b, a, above said valve, and a wire, k, connected to said valve and passing outwardly beyond said obstructions, substantially as described and shown.

2. In a device to prevent the refilling of bottles, the combination of a valve, as d, held to its seat automatically by a suitable spring, e, obstructions, as c, b, a, above said valve, adapted to prevent access thereto, said valve connected to a part of a wire, k, another part of which is carried beyond such obstructions, substantially as described and shown.

3. In a device to prevent the refilling of bottles, the combination of a valve adapted to close the bottle opening, a spring adapted to hold said valve to its seat, obstructions disposed above said valve, and a suitable retracting device, as the wire, k, connected to said valve and adapted to retract the same and to be disconnected therefrom, substantially as described and shown.

4. In a bottle closing device provided with a suitable valve adapted to close the neck of the bottle, and obstructions between such valve and the orifice of the bottle, the combination with such valve of a retracting device connected therewith and passing beyond such obstructions, substantially as described and shown.

5. A bottle provided in its neck with obstructions as a, b, c, a valve, as d, disposed interiorly of such obstructions, a wire, k, having a part connected to said valve, and a part passing outwardly beyond such obstructions, in combination with a suitable device, as the spring, e, adapted to hold said valve closed against ingress of liquid in whatever position the bottle may be placed, substantially as described and shown.

HORATIO R. HARPER.

Witnesses:
EMMA C. MILLER,
ELMER A. ALLEN.